United States Patent [19]

Lynch

[11] Patent Number: 6,033,715
[45] Date of Patent: Mar. 7, 2000

[54] PROCESS FOR REDUCING FAT CONTENT OF PORK SKIN AND PRODUCTS MADE THEREFROM

[75] Inventor: Donald A. Lynch, Weslaco, Tex.

[73] Assignee: Bryan W. Scott, Houston, Tex.; a part interest

[21] Appl. No.: 09/187,955

[22] Filed: Nov. 6, 1998

[51] Int. Cl.⁷ .................................................. A23L 1/312
[52] U.S. Cl. ........................ 426/641; 426/284; 426/512; 426/518; 426/641; 426/646; 426/805
[58] Field of Search ..................... 426/284, 512, 426/518, 641, 646, 805

[56] References Cited

U.S. PATENT DOCUMENTS

| | | | |
|---|---|---|---|
| 5,047,231 | 9/1991 | Spanier et al. | 426/805 |
| 5,100,651 | 3/1992 | Boyer | 426/805 |
| 5,149,550 | 9/1992 | Mohilef | 426/805 |
| 5,897,893 | 4/1999 | Mohilef | 426/805 |

FOREIGN PATENT DOCUMENTS

| | | | |
|---|---|---|---|
| 0241896 | 10/1987 | European Pat. Off. | 426/805 |

*Primary Examiner*—Helen Pratt
*Attorney, Agent, or Firm*—Felsman, Bradley, Vaden, Gunter & Dillon; Frank S. Vaden III; Frank C. Turner

[57] ABSTRACT

A process is disclosed for the calculated removal of fat from pork skin. Pork skin is subjected to tumbling cycles during which the pork skin is tumbled first in warm water and subsequently in warm water containing salt and concentrated laundry detergent. As this two step cycle is repeated, fat contained within the pork skin separates and is drained from the pork skin with the rinse water. The cycle may be repeated until the pork skin contains a desired percentage of fat. The process does not require that the pork skin be ground or otherwise comminuted in order to selectively remove fat from the material, nor does the process use harsh solvents or chemicals that might render the pork skin inedible or toxic. Because the process is all natural, the reduced fat whole pork skin is edible and may be formed into a variety of canine treats through additional processing and cooking. These canine treat products may include knotted bones, twisted products, chips, filled bones, sticks, patties and various ground products.

38 Claims, No Drawings

PROCESS FOR REDUCING FAT CONTENT OF PORK SKIN AND PRODUCTS MADE THEREFROM

BACKGROUND OF THE INVENTION

1. Field of the Invention

The field of the present invention concerns the use of animal skins as food treats for canines. These treats may be prepared from a variety of materials such as cow raw hide or pork skins. The process and products of the present invention concern the use of pork skin and the removal of a desired amount of fat from that starting material. The present invention does not concern the use of pork skin for non-dietary purposes, nor does it concern a process for use on pork meat.

2. Description of the Prior Art

Traditionally, canine treats have been made from cow raw hide or pork skin. Raw hide has significant disadvantages in that it is indigestible providing no nutritional value to the animal and is well known for becoming lodged in the animal's throat or digestive tract. Pork skin is a more preferable material for canine treats since it is digestible providing nutritional value to the animal.

Historically, pork skin has been used as a base material for a variety of non-food products such as shoes, gloves, belts and other items. In the manufacture of these types of goods, any fat present in the raw material must be removed and conventional techniques are known that will entirely remove fat from pork skin. However, these known techniques typically involve saturating the pork skin with strong hydrocarbon solvents that will solubilize any fat that is present in the material. Not only do such techniques remove all of the fat that is held within the pork skin, but the use of these solvents renders the pork skin inedible and in some cases toxic. Therefore, there remains a need for a process that will allow for the controlled removal of fat from pork skin and that will not render the pork skin inedible upon completion of the process.

There are also known techniques and processes for the removal of fat from various types of raw meat materials such as beef, fowl, pork and seafood products. U.S. Pat. No. 5,221,554, issued to Gamay, entitled "Process for producing low-fat meat products" is an example. The '554 patent discloses a process in which the meat is comminuted into small particles, typically through grinding, in the presence of water with ionic strength manipulation. The meat in solution is then fractionalized into fatty materials, connective tissues and low fat meat particles. The disclosed process, however, does not address pork skin, the removal of a controlled amount of fat therefrom, or the manufacture of products from that material. Further, the process requires that the meat be broken down into smaller particles in order to remove fat from the meat.

Several other known techniques for removing fat from meat materials include grinding the meat and extruding it through a specially designed heat exchanger as described in U.S. Pat. No. 4,567,050, entitled, "Method for processing meat products"; exposing the meat material to ultraviolet light and comminuting the meat at low temperatures in the presence of edible acids, salts and food phosphates as described in U.S. Pat. No. 4,788,682, entitled "Method of preparing a low-fat, low-cholesterol raw meat product"; introducing a heated unsaturated oil into the material to solubilize the fat for subsequent extraction, as is described in U.S. Pat. No. 4,980,185, entitled "Method for making meat products having a reduced saturated fat and cholesterol content"; and various techniques that comminute the meat, and use heat treatments to separate the fat as illustrated by U.S. Pat. No. 5,762,993, entitled "Process for preparing reduced fat meat". All of these processes are directed at removing a high percentage of the fat from the meat so that it may be used to prepare food products for human consumption that may be characterized as either low in fat or "fat free." These disclosed processes and techniques are not intended for use on pork skin or other animal skin materials but are directed at meat and meat trimmings. They require that the meat used be reduced to smaller particle sizes either through grinding or hand trimming before the disclosed process can be used to remove fat retained in the meat. Further, the operating temperatures discussed in these processes are relatively low so that the taste or texture of the meat is not adversely affected by the fat removal process. These lower operating temperatures are generally too low to effect the removal of fat from animal skin materials such as pork skin. Furthermore, these processes are not designed for and thus, are incapable of removing an incremental amount of fat from animal skin materials such the fat content of the final product may be selected during processing.

Therefore, it is an object of the present invention to provide an all natural process for removing a controlled amount of fat from pork skin rendering it a nutritional material.

It is another object of the present invention to provide a fat removal process that does not require the comminuting or grinding of the animal skin material prior to removing fat therefrom such that the reduced fat material may be subsequently used to produce a greater variety of food and treat products.

It is an additional object of the present invention to provide a process for preparing a variety of treat products that will appeal to canines using the reduced fat pork skin material. These additional products may include simulated bones, chips, twisted products, filled bones, patties, sticks and similar treat products.

It is an additional object of present invention to provide a fat removal process that does not require the use of harsh solvents or chemicals that might otherwise render the pork skin inedible or unfit for consumption.

It is a further object of the present invention that the process may be carried out using conventional materials and equipment, requiring a minimal skill and supervision.

SUMMARY OF THE INVENTION

The process of a preferred embodiment of the present invention is one intended to remove a controlled amount of fat from an animal skin material so that the material may be appropriately processed for subsequent consumption. The fat removal process includes a first agitation cycle in which whole pork skins are placed in warm water and tumbled and a second agitation cycle in which the pork skins are tumbled in the presence of warm water, salt and laundry detergent. The fat in the pork skin is gradually removed through this two cycle process and the cycle should be repeated until the desired level of fat is reached. When the pork skins have a desired amount of fat, the material is then agitated in a final agitation step in which it is submersed in a solution of heated water, sugar and a flavoring agent such as liquid smoke. The process is all natural and does not involve the use of harsh solvents or chemicals.

The whole reduced fat pork skins containing a selected percentage of fat may be formed into a variety of desired shapes and cooked using a variety of processes and equipment. In addition, the reduced fat pork skins may be ground and mixed with other ingredients for use in manufacturing a variety of edible products.

These and other objects, advantages, and features of this invention will be apparent to those skilled in the art from a consideration of this specification including the appended claims.

DESCRIPTION OF THE PREFERRED EMBODIMENTS

In the process of the present invention, fat is removed from whole pork skin so that it contains a nutritionally desirable amount of fat. The reduced fat whole pork skins may then be further processed into a number of different canine treat products.

As noted herein, canine treat products have traditionally been made from cow raw hide. However, raw hide is rigid and indigestible providing no nutritional value to the animal and in some cases creating a hazard should the material become lodged in the animal's throat or digestive tract. Whole pork skin is a more desirable material since it is softer and digestible. However, pork skin contains a higher percentage of fat than may be desirable for edible canine treat products and the present invention is directed at removing that excess. In addition, medical and industrial research commonly utilize pork skin because of its similarities to human skin. It is anticipated that the fat removal process described herein may be used to more closely simulate pork skin to human skin for such purposes.

Pork skin in general does not contain a uniform amount of fat. The fat content of pork skin will vary significantly depending on the diet and environment in which the pork herd is raised. For instance, pork raised in the mid-western United States will have pork skin with a significantly different fat content than pork raised in the southeastern United States. The following description is based on the process conditions that are required for pork skin having 60% to 70% raw weight fat and moisture content.

The process may require slight modification to optimize the removal of fat from the pork skin depending on its initial fat content. For instance, the fat content of the pork skin will control the tumbling times and concentration of solutions used in those cycles. Generally, a higher fat content will require shorter tumbling cycles as the solution becomes saturated with fat more quickly reducing the effectiveness of the detergent in solution. In addition, generally lower concentrated solutions may be used in the process by increasing the tumbling time and shorter tumbling times may be used by increasing the concentration of the solutions.

Regardless of the fat content of the raw pork skin, the temperature of the solutions used in the fat reduction process should be maintained within a narrow range. Typically, this range will be about 140 degrees to about 145 degrees Fahrenheit. All temperatures mentioned in this disclosure are stated in degrees of Fahrenheit. This range must be maintained for if the temperature is too low the tumbling process will be ineffective at removing fat. Alternatively, it has been found that if the temperature is maintained above this range, the protein in the pork skin will denature and the material will disintegrate during the tumbling cycle.

Initially, the raw pork skin is cleaned and placed in a commercial tumbler machine. The tumbler provides messaging and agitation action on the pork skin and its size and features may significantly affect the duration of tumbling that is required. The tumbler used in this description is a commercial tumbler having a five hundred pound capacity, a diameter of approximately three feet and was typically operated at eighteen to twenty four rpms. The action of the tumbler on the pork skin is dependent on the size and speed of the tumbler. Typically, tumbling times may be shortened by running the tumbler at faster rpms and/or by using a smaller tumbler. However, the effect of faster rpms may be negated if the pork skins are tumbled in a tumbler with a larger diameter. In addition, commercial tumblers are available that have temperature control for maintaining the contents at a specific temperature.

In the example used throughout, approximately three hundred and seventy five pounds of whole raw pork skin was cleaned and placed in the tumbler. The pork skin in the tumbler was covered with warm water and tumbled for about five minutes.

The water is drained from the tumbler and the pork skin is covered with a solution containing warm water, salt and a concentrated laundry soap. As noted above, the concentration of these agents in the solution will vary depending on the initial fat content of the pork skin, the tumbling time, and the desired fat content in the end product. Generally, two pounds of salt and one cup of concentrated laundry detergent are used for every hundred pounds of pork skin. Where three hundred and seventy five pounds of pork skin having an initial fat and moisture content of 60%–70% were used, eight pounds of salt and four cups of concentrated laundry detergent were used to prepare the solution. The pork skin was tumbled in this solution for approximately fifteen minutes.

At the conclusion of these two tumbling cycles, the fat that is free in the rinse water and that on the surface of the pork skin is visually inspected. Where desired, the fat removed and that remaining in the pork skin may be quantified using known testing techniques. If upon testing a lower fat content is desired, the above described tumbling cycles should be repeated. It is anticipated that the tumbling cycles may need to be repeated multiple times to achieve a reduced fat whole pork skin product that has a desired fat content.

Once the desired fat content is reached, the pork skins are tumbled in a final tumbling cycle in a solution containing warm water and one or more flavoring agents. In the present example, one half gallon of liquid smoke and twelve pounds of sugar were added to the warm water as flavoring agents. Generally, where sugar is added as a flavoring agent, roughly three pounds of sugar should be added per one hundred pounds of pork skin. This final tumbling cycle is preferably maintained for approximately twenty minutes until the skin becomes coated and saturated with the flavoring agents. Although the final tumbling cycle may be increased, it should not exceed one hour. Upon completion of the final tumbling cycle, the tumbler is drained and the reduced fat whole pork skins are removed for storage and further processing.

The reduced fat pork skin may be used to manufacture a variety of canine food treats including knotted bones, twisted strips, chips, filled bones, sticks, patties and other ground products. The following description of several of these products is provided.

Knotted bones are prepared by first cooking the reduced fat pork skin in an oven. The reduced fat skins are placed flat on shelves in an oven so that there is no overlap between skins. The oven may be any conventional oven but should have a damper that may be opened or closed during cooking. The skins are preferably cooked at 160 to 165 degrees for about six to eight hours with the damper open. The cooked skins are then subjected to a first tumbling cycle submerged in a solution of warm water with salt and concentrated laundry detergent. This first tumbling cycle is maintained from eight to twelve minutes but is preferable ten minutes depending on the fat content of the cooked pork skins and the concentration of the solution. After draining, the cooked pork skins are subjected to a second tumbling cycle in a solution of warm water for preferably four to six minutes.

After draining and removal from the tumbler, the skins are cut into elongated strips and knots are tied in the strip about five inches apart. The elongated strips are preferably two to two and a half inches in width. Two knots and the strip connecting them form the simulated bone or knotted bone. Excess skin is cut from the knotted bone and the bone is placed in the oven on a rack with the seam side down. The knotted bones are preferably cooked for eight to ten hours at 130 to 140 degrees with the dampers open. Following cooking, the cooked bones may be stored in ventilated containers at room temperature. The fat content of the knotted bones will be about 10% to 12%.

Twisted strips are prepared by taking the reduced fat whole pork skins and cutting the skins into elongated strips of preferably one and a half to two inches in width and at least twenty-one inches in length. The lengths of the strips will depend on the size of the oven racks or screens on which the strips will be attacked during cooking. A slice is cut into each strip at either end and used to attach the strip to a screen. The strip is attached to the screen by one end and the strip is twisted to the degree desired. The twist should be even along the full length of the strip. The free end of the strip is then attached to the screen or rack. The twisted strips may be refrigerated in this condition for up to 10 days or more.

There are three distinct cooking steps in cooking the twisted strip products. The racks or screens are placed in the oven and cooked at preferably 130 to 145 degrees for about six hours with the oven damper closed. The purpose of the first cooking step is to maintain the moisture in the oven and to slowly heat the strips throughout and to start cooking the strips from the inside to the outside. In the second cooking step, the heat is increased and the oven damper is opened. Preferably the second cooking step will be at 155 to 160 degrees for thirty hours or more. The cooking is then concluded by raising the temperature to about 175 to 180 degrees for approximately six hours with the damper open. Following the cooking, the cooked twisted strips are removed from the racks, cut into desired lengths and packaged in ventilated containers. Refrigeration of the strips after cooking is not necessary and is not recommended. The fat content of the final twisted strip product will be about 18%.

The chip product is manufactured by first cooking the reduced fat whole pork skins. The skins are spread out on oven racks without overlap and placed in a conventional oven or preferably a smokehouse. The pork skins are cooked for about eight to about ten hours at 160 to 165 degrees. The whole skins should be rinsed with hot water several times throughout this cooking. At the conclusion of the cook cycle, the cooked skins should be steamed or atomized with a lactic acid solution for approximately 45 minutes. The lactic acid solution may be prepared using two ounces of lactic acid per gallon of water.

The whole skins are removed from the racks and chips are cut from the skins using conventional techniques. If the cooked pork chips are greasy following cooking, they may be tumbled in a solution of warm water, salt and laundry detergent for about ten minutes. The solution of salt and detergent would be prepared at concentrations of about one half of those described above in connection with the removal of fat from whole uncooked pork skins. In the present case, five pounds of salt and two cups of detergent were added to the warm water solution. Following this first tumbling cycle, the tumbler will be drained and filled with warm water for a second tumbling cycle of about five minutes. Be certain to drain the tumbler immediately after the second tumbling cycle complete. The chips are then placed randomly on the oven racks or shelves and cooked for preferably six to eight hours at 140 degrees with the oven damper open. The fully cooked chips may be stored in ventilated containers at room temperature. The fat content of the chip product will be about eight to ten percent by weight.

Various ground products may also be prepared from the reduced fat whole pork skins by loading the skins loosely onto oven shelves or racks and cooking the skins at 175 to 180 degrees for preferably ten to twelve hours. Following this initial cooking, the cooked skins are loaded into the tumbler and tumbled in a solution of warm water, salt and detergent as described above. This first tumbling step is maintained for preferably ten minutes and then the skins are rinsed thoroughly. In the present example, three gallons of warm water, two pounds of sugar and three ounces of lactic acid were then added to the tumbler and tumbled for approximately five minutes. After draining the solution from the tumbler, skins were removed and ground using a one quarter inch grinding plate. The ground skin is then spread out on fine mesh screens and rinsed thoroughly with hot water. The screens are placed in the oven and the ground pork skin is cooked for preferably ten to twelve hours at 160 degrees. This ground product may then be used for mixing with other ingredients for use as fillers, in making patties and forming or extruding into a variety of other shapes. However, it is cautioned that this ground pork should not be stored wet or above about 50 degrees. The fat content of the ground pork skin should not exceed twelve percent and preferably be about ten percent by weight.

For instance the ground product may be used to fill natural bones such as femurs and tibias where the marrow was once located. In such a process the bones are cut to desired lengths and cleaned in several tumbling cycles. Initially, a tumbler is filled one third to one half full with cut bones. The tumbler is then filled with a warm water and citric acid solution. In the present example, approximately 2 cups of citric acid were added to the tumbler. Tumbling of the bones is maintained for approximately thirty minutes, but the purpose here is to clean any existing marrow and other debris from the cut bones. The tumbler is drained and four cups of flavoring agent such as a liquid smoke is added to two gallons of warm water. The bones are tumbled in this solution for approximately fifteen minutes or until the bones are coated and saturated with the flavoring agent. The cleaned bones are ready to be stuffed with the ground pork skin stuffing or other known stuffing materials.

The ground pork skin stuffing may be prepared by mixing three pounds of the ground pork skin with approximately 360 ml of a pre-gelled starch, and 30 ml of a gelatin. The pre-gelled starch is preferable tapioca and the gelatin is type B, 225 Bloom. These three ingredients may be mixed dry. Two pounds of water and 1 tablespoon of liquid smoke are added to the initial mixture with mixing. The mixture is ground together using a three eights inch grinding plate. This ground mixture may then be stuffed into the cleaned bones. The stuffed bones are placed on oven racks and cooked.

The cooking of the stuffed bones involves two steps. The first utilizes a lower heat and a closed damper to retain the heat and moisture within the oven. This step is preferably carried out at 130 to 140 degrees for approximately six hours, thereby cooking the stuffed bones from the inside to the outside. In the second step, the cooking time and temperature are increased to preferably 150 to 160 degrees for approximately twelve hours. Optionally, the cooked stuffed bones may be steamed or atomized at the conclusion of minutes at the conclusion of the cooking with a flavored solution, such as a 50% solution of liquid smoke containing one to two ounces of lactic acid. In addition, the ground pork skin can be used to form a variety of shaped products such as patties and sticks. These products may be formed by extrusion, mold or hand.

Although the invention described above is described in terms of the use of pork skin as the base raw material, it is anticipated that the process and products described herein may have equal applicability to a variety of other animal hide materials.

From the foregoing it will be seen that this invention is one well adapted to attain all of the ends and objects hereinabove set forth, together with other advantages which are obvious and which are inherent to the process and products made therefrom.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matters herein set forth are to be interpreted as illustrative and not in a limiting sense.

What is claimed:

1. A process for reducing the fat content of whole animal skins, the process comprising the steps of:
    agitating pork skins during a first agitation step in heated water and draining;
    agitating the skins during a second agitation step in a solution of heated water, salt and laundry detergent and draining;
    testing the fat content remaining on the skins and repeating the first and second agitation steps to further reduce fat content as desired; and
    agitating the fat reduced skins during a final agitation step in a solution of heated water, and at least one flavoring agent and draining.

2. The process of claim 1, wherein the temperature of the water during agitation is controlled between about 140 and about 145 degrees Fahrenheit.

3. The process of claim 1, wherein the first agitation step is maintained for about four to about six minutes, the second agitation step is maintained for about ten to about twenty minutes and the final agitation step is maintained for between about fifteen and about thirty minutes.

4. The process of claim 1, wherein the skins are agitated by tumbling.

5. The process of claim 1, wherein the salt is added to the skins during the second agitation step in a ratio of about a two pounds of salt per one hundred pounds of skin.

6. The process of claim 1, wherein the laundry detergent is added to the skins in a ratio of about one cup of concentrated detergent per one hundred pounds of skin.

7. The process of claim 1, wherein the testing of the fat content is conducted by visual inspection.

8. The process of claim 1, wherein the flavoring agents are smoke flavor and sugar.

9. The process of claim 8, wherein the sugar is added to the reduced fat skin during the final agitation step in a ratio of about three pounds of sugar per one hundred pounds skin.

10. The process of claim 1, further comprising the steps of slicing the reduced fat whole skins into elongated narrow strips, attaching the strips by a first end to a screen, twisting the strip to form a twisted product, and attaching the opposite end to the screen.

11. The process of claim 10, further comprising the step of cooking the twisted product in a first cooking step for about six hours between about 130 and about 145 degrees Fahrenheit, in a second cooking step for about 30 hours between about 155 and about 160 degrees Fahrenheit and in a final cooking step for about six hours between about 175 degrees and about 180 degrees Fahrenheit.

12. The process of claim 11, where in the twisted skins are cooked in a commercial oven having a damper, the damper being closed during the first cooking step.

13. A twisted skin product made in accordance with the process of claim 11, the product having a fat content of approximately eighteen percent by weight.

14. The process of claim 1, further comprising the steps of spreading the reduced fat whole skins flat in an oven and cooking the skins for between about six and about eight hours at a temperature between about 160 and about 165 degrees Fahrenheit.

15. The process of claim 14, further comprising the steps of:
    agitating the whole cooked skins during a first agitation step in a solution of heated water, salt and laundry detergent and draining;
    agitating the whole cooked skins during a second agitation step in heated water and draining;
    forming a simulated bone by cutting the cooked skins into narrow elongated strips, tying a first knot in the strip, tying a second knot in the strip adjacent the first knot, and cutting the simulated bone from the strip; and
    cooking the simulated bone at a temperature between about 130 and about 140 degrees Fahrenheit.

16. The process of claim 15, wherein the first agitation step is maintained for about eight to about twelve minutes, the second agitation step is maintained for about four to about six minutes.

17. The process of claim 15, wherein the simulated bone is cooked for a period of about eight to about ten hours.

18. A simulated bone product made in accordance with the process of claim 15, the product having a fat content of about ten to about twelve percent by weight.

19. The process of claim 1, further comprising the steps of spreading the reduced fat skin out in an oven, cooking for about eight to about ten hours at a temperature of about 160 to about 165 degrees Fahrenheit, rinsing the cooking skin with water and steaming the skin for about 45 minutes with an acidic solution at the conclusion of the cooking.

20. The process of claim 19, wherein the acidic solution is a solution of lactic acid having about two ounces of lactic acid per gallon of water.

21. The process of claim 19, further comprising the steps of:
    forming chips from the cooked skins;
    agitating the chips during a first agitation step in a solution of heated water, salt and laundry detergent and draining;
    agitating the chips during a second agitation step in heated water and draining;
    drying the chips; and
    cooking the chips at a temperature of about 140 degrees Fahrenheit.

22. The process of claim 21, wherein the first agitation step is maintained for about eight to about twelve minutes, the second agitation step is maintained for about four to about six minutes.

23. The process of claim 21, wherein the chips are cooked for about six to about eight hours.

24. A skin chip product made in accordance with the process of claim 21, wherein the chip has a fat content of about eight to about ten percent by weight.

25. The process of claim 1, further comprising the steps of:
cooking the reduced fat whole skins at a temperature of about 175 to about 180 degrees Fahrenheit;
agitating the whole cooked skins during a first agitation step in a solution of heated water, salt and laundry detergent and draining;
rinsing the whole cooked skins;
agitating the cooked skins during a second agitation step in a solution of heated water, sugar and an acid;
comminuting the cooked skins down to a small particle size;
spreading the comminuted skin out on a fine mesh screen;
rinsing the comminuted skin with hot water; and
cooking the comminuted skin at a temperature of about 160 degrees Fahrenheit.

26. The process of claim 25, wherein the whole skin is cooked for about ten to about twelve hours.

27. The process of claim 25 wherein the first agitation step is maintained for about eight to about twelve minutes and the second agitation step is maintained for about four to about six minutes.

28. The process of claim 25, wherein the comminuted skin is cooked for about ten to about twelve hours.

29. The process of claim 25, wherein the solution of water, sugar and acid contains about one gallon of water, about two thirds of a pound of sugar and about one ounce of lactic acid per hundred pounds of skin.

30. A comminuted pork skin product made in accordance with the process of claim 25, the product having a fat content of about ten percent by weight.

31. The process of claim 1, further comprising the steps of:
cutting bones to a desired length;
agitating bones during a first agitation step in a solution of heated water and citric acid and draining;
rinsing the bones;
agitating the bones during a second agitation step in a solution of heated water and a flavoring agent;
filling the hollow bones with a reduced fat pork skin filler;
cooking the filled bones during a first cooking step at a temperature of about 130 to about 140 degrees; and
cooking the filled bones during a second cooking step at a temperature of about 155 to about 160 degrees.

32. The process of claim 31, wherein the first agitation step is maintained for about thirty minutes and the second agitation step is maintained for about fifteen minutes.

33. The process of claim 31, wherein the first cooking step is about six hours and the second cooking step is about twelve hours.

34. The process of claim 31, wherein the filled bones are cooked in a oven having a damper, the damper remaining closed during the first cooking step.

35. The process of claim 31, further comprising the step of steaming the cooked bones for about 45 minutes with an acidic solution containing a flavoring agent at the conclusion of the cooking.

36. The process of claim 31, wherein the filler is prepared in the steps of mixing about three pounds of cooked comminuted skin with about 360 ml of a pre-gelled starch and about 30 ml of a gelatin, adding water and a flavoring agent to the mixture; and comminuting the mixture.

37. A filled bone product made in accordance with the process of claim 31, the bone product having a fat content of about ten percent by weight.

38. The process of claim 1, further comprising the steps of comminuting the reduced fat skin, extruding the comminuted skin into sticks and cooking.

* * * * *

UNITED STATES PATENT AND TRADEMARK OFFICE
CERTIFICATE OF CORRECTION

PATENT NO : 6,033,715
DATED : March 7, 2000
INVENTOR(S) : Donald A. Lynch

It is certified that error appears in the above-identified patent and that said Letters Patent is hereby corrected as shown below:

Column 7, lines 7-8: after "atomized" replace "at the conclusion of minutes" with -- for about forty-five minutes --.

Signed and Sealed this

Twenty-seventh Day of March, 2001

NICHOLAS P. GODICI

*Attest:*

*Attesting Officer*

*Acting Director of the United States Patent and Trademark Office*